United States Patent [19]

Westerink et al.

[11] Patent Number: 5,353,056
[45] Date of Patent: Oct. 4, 1994

[54] SYSTEM AND METHOD FOR MODIFYING ABERRATION AND REGISTRATION OF IMAGES

[75] Inventors: Peter H. Westerink; Thomas J. Leacock, both of Mount Laurel, N.J.

[73] Assignee: Panasonic Technologies, Inc., Secaucus, N.J.

[21] Appl. No.: 967,266

[22] Filed: Oct. 27, 1992

[51] Int. Cl.⁵ .............................................. H04N 9/093
[52] U.S. Cl. .................................. 348/263; 348/265
[58] Field of Search ..................... 358/213.15, 50, 51, 358/167; 348/262, 263, 265; H04N 9/093

[56] References Cited

U.S. PATENT DOCUMENTS

| | | | |
|---|---|---|---|
| 4,500,202 | 2/1985 | Smyth | 358/106 |
| 4,774,581 | 9/1988 | Shiratsuchi | 358/180 |
| 5,057,911 | 10/1991 | Stec et al. | 358/11 |
| 5,113,247 | 5/1992 | Akiyama et al. | 358/51 |
| 5,157,481 | 10/1992 | Kashimura et al. | 358/51 |
| 5,249,038 | 9/1993 | Stec | 358/11 |

Primary Examiner—Joseph Mancuso
Assistant Examiner—Wendy R. Greening
Attorney, Agent, or Firm—Ratner & Prestia

[57] ABSTRACT

Apparatus and a method are described for modifying the magnification and registration factors of an image using digital signal processing and interpolation. The apparatus is used in a camera system which samples an image to generate sampled data signals. The sampled data signals are first interpolated across the either the rows or columns of the image and then across the columns or rows of the image to change the magnification and registration factors of the images represented by each of the sampled data signals to some common desired magnification and registration factors. The system electronically corrects for chromatic aberration and geometric distortion in the image caused by the lens system and skew among the images caused by misalignment of the respective color image sensors.

10 Claims, 5 Drawing Sheets

SYSTEM AND METHOD FOR MODIFYING ABERRATION AND REGISTRATION OF IMAGES

BACKGROUND OF THE INVENTION

Common camera imaging systems generally use a lens system, including one or more lenses, to focus light into an image which is converted into electrical signals by an electrical device. One type of electrical device which is commonly used is an array of Charged Coupled Devices (CCDs). This device measures the intensity of the focused light at selected spatial positions. The selected spatial positions generally define an orthogonal matrix structure made up a of a predetermined number of rows and columns.

During the conversion from a light image to electrical signals, the image may be distorted due to the imperfections in the lens system and in the CCD arrays. These distortions may be inherent in the system, for example, geometric distortions or chromatic aberrations in the lens system, or they may be caused by errors in component manufacture or assembly, for example, misregistration due to the misalignment of the CCD arrays. The chromatic aberrations caused by lenses act to positively or negatively magnify images while the misalignment of the CCD arrays acts to laterally or vertically shift images.

Lateral chromatic aberrations occur because light rays of different frequencies are magnified differently by a lens. Thus, for a color picture which is commonly separated into the tripartite system of Red, Green, and Blue (R, G, and B) images, the three color images have different levels of magnification after being processed by the same lens.

Misregistration occurs in camera systems because the separate CCD arrays are not consistently aligned. Commonly, a white light image is separated into different monochrome light images, e.g., red (R), green (G) & blue (B) images and then sampled by separate CCD arrays. If the CCD arrays are not properly aligned, the different light images will be sampled at different spatial positions. This misregistration of the sampled images causes color edges in the combined images to appear at different positions.

The current solution to eliminate the distortions caused by lenses and the misregistration by CCD arrays is to make lenses with stringent design criteria and mount CCD arrays with stringent tolerances. These solutions, however, also lead to expensive camera systems.

SUMMARY OF THE INVENTION

The present invention uses interpolation to restore different signals or misregistered images to their proper size. The desired magnification and registration factors may be those of another existing image or of a nonexistent desired image so that when the different images are combined the data samples which make up the images will be spatially aligned.

The invention is a signal processing system which modifies electrical signals representing different components of an image to change the magnification and registration factors of the composite image to match some desired magnification and registration factors where the magnification and registration factors of the image components are incorrect due to image being processed by a camera system.

The signal processing system receives digital signals representing the component images and interpolates the digital signals to produce modified digital signals. These modified signals represent the component images having substantially the desired magnification and registration factors.

DETAILED DESCRIPTION OF THE INVENTION

Overview

Figure 1:
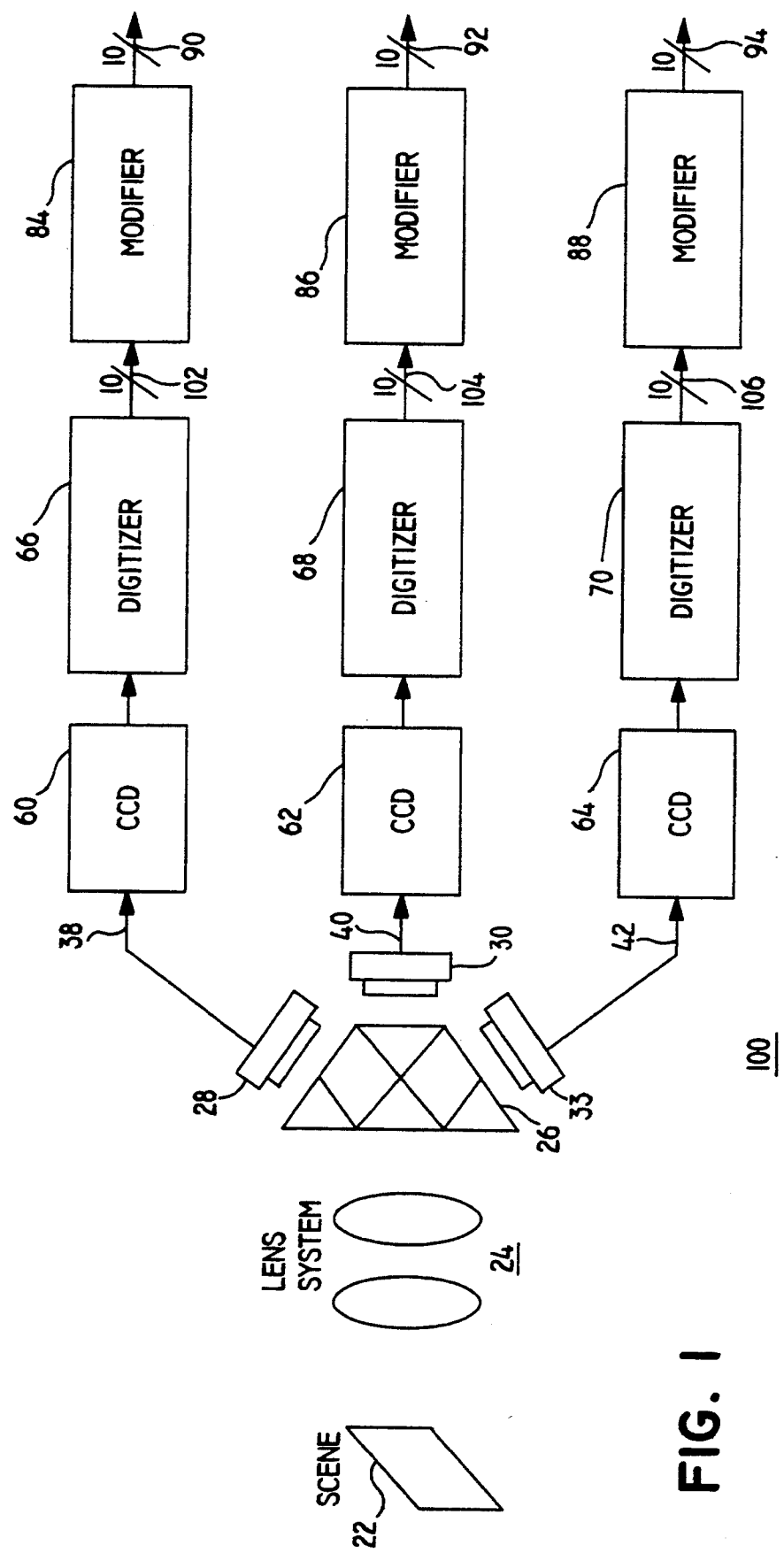
FIG. 1 is a block diagram which illustrates the configuration of an exemplary camera system containing an embodiment of the invention.

The camera system 100 shown in FIG. 1 includes an exemplary embodiment of the invention. An ordinary camera system which generates sampled data signals may include a lens system 24, a prism 26, color filters 28, 30, and 33, CCD arrays 60, 62 and 64, and digitizers 66, 68, and 70. The exemplary system 100 according to the present invention also includes modifiers, 84, 86, and 88, which are used, as described below, in one embodiment of the present invention. While the invention is illustrated with CCD image sensors, it is contemplated that it may be applied to cameras having other types of image sensors, for example Saticon or Plumbicon imaging devices.

The system 100 generates three sampled data signals each representing a separate monochrome component of the white light reflected from a scene 22. The lens system 24 focuses light reflected from the scene 22 through a prism 26 and color filters 28, 30, and 33 onto the respective CCD arrays 60, 62, and 64.

The prism 26 splits light from the lens system 24 into three parts which are passed to the three color filters. The color filter 28 permits light of certain frequencies to be focused upon the CCD array 60, e.g., frequencies which define the color green. The color filters 30 and 33 act in a manner similar to the color filter 28. The color filter 30 permits light of frequencies which define the color blue to be focused upon CCD array 62. The color filter 33 permits light of frequencies which define the color red to be focused upon CCD array 64.

Figure 2:
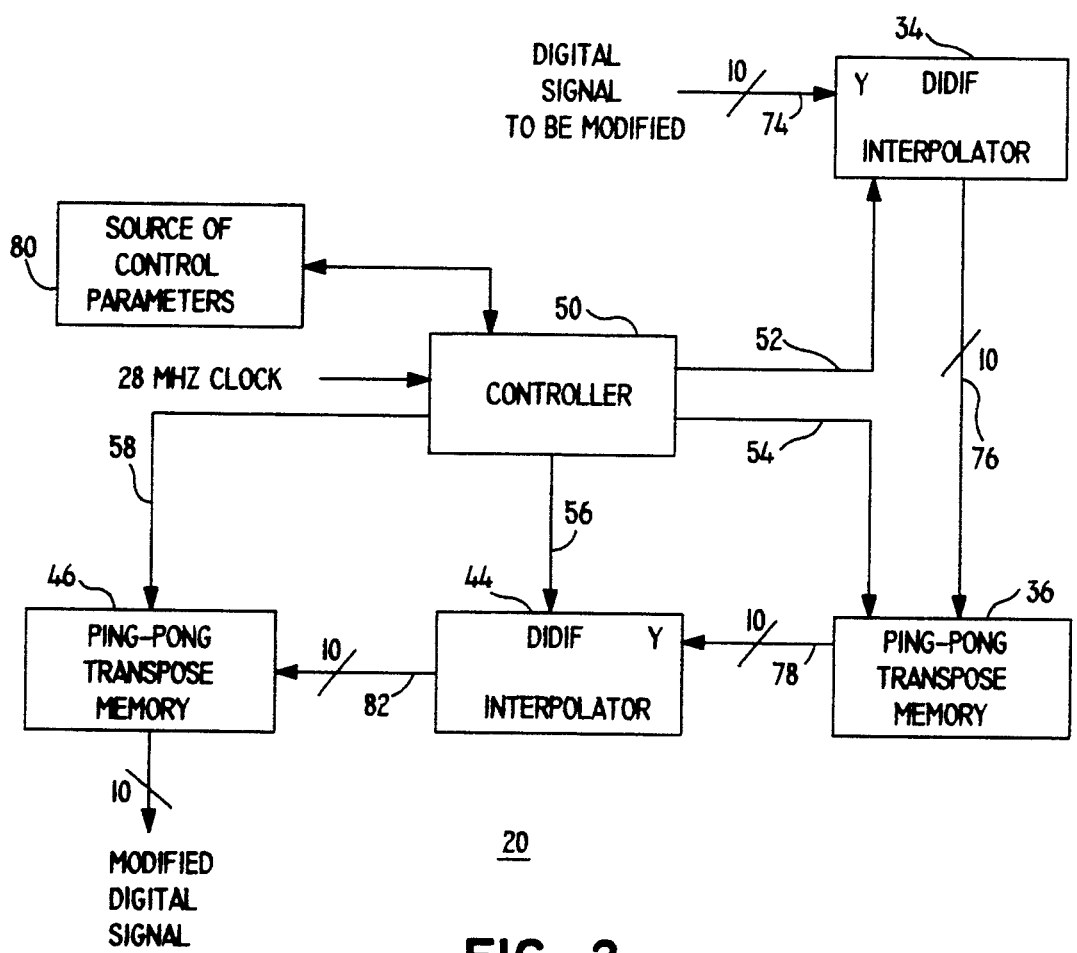
FIG. 2 is a block diagram which illustrates a modifier suitable for use in the camera systems shown in FIGS. 1 and 4.
Figure 5:
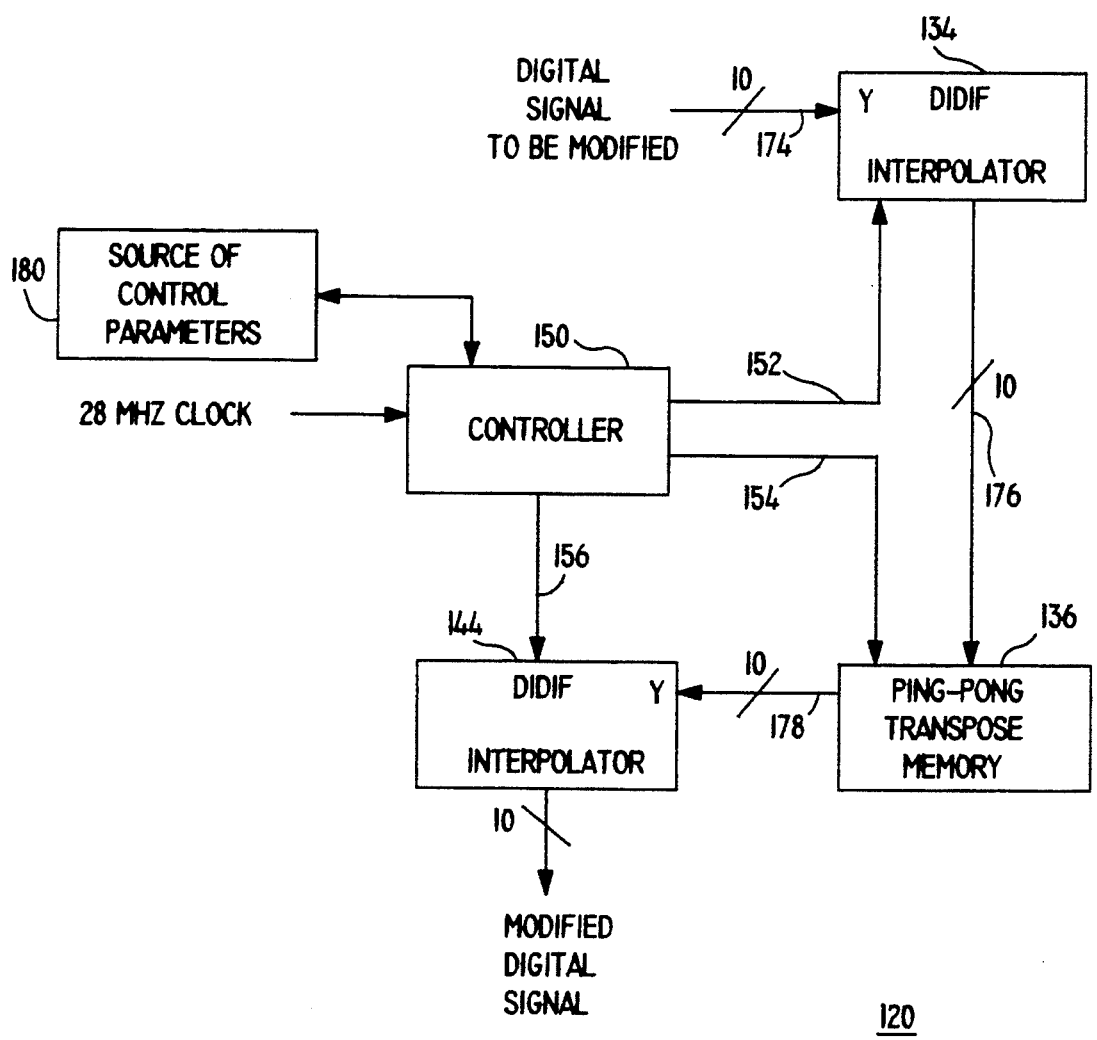
FIG. 5 is a block diagram which illustrates a modifier suitable for use in the exemplary camera systems shown in FIGS. 1 and 4.

The CCD arrays 60, 62, and 64 spatially sample the light focused upon them by the color filters at certain time intervals to generate charge-packet samples. Each CCD array samples the light focused upon it at selected spatial positions which are in an orthogonal matrix structure made up of a number of rows and columns. If the modifier shown in FIG. 2 is used in this system, then the CCD arrays generate charge-packet samples at the selected spatial positions in raster order, i.e., along the first row from left to right, then along the second row, et cetera. If the modifier shown in FIG. 5 is used in this system, then the CCD arrays generate charge-packet samples at the selected spatial positions in transpose raster order, i.e., along the first column from top to bottom, then along the second column, et cetera.

The charge-packet samples from the CCD arrays 60, 62, and 64 are digitized by digitizers 66, 68, and 70, respectively. Each digitizer, which may include, for example, a conventional analog to digital converter, generates a 10-bit digital signal for each charge-packet sample. The digital signal is a sampled, digital form of the light focused upon the CCD array by a color filter.

In this embodiment, the three digital signals 102, 104, 106, represent different monochrome components of the light reflected from the scene 22 and focused by the lens system 24. Due to the effects of chromatic aberration inherent in the lens system 24, each of the digital signals 102, 104, and 106 may have a different magnification (aberration) factor relative to an ideal reference image. Geometric distortions in the lens system 24 may also vary the magnification of the digital signals as a function of spatial position within the image described by each of the signals. In addition, unless the CCD arrays 60, 62, and 64 are consistently and precisely aligned, each digital signal 102, 104, and 106 may also have a different registration.

The remainder of the system 100 changes the magnification and registration factors of the three images to some desired magnification and registration factors. Since each digital signal 102, 104, and 106 could have different magnification and registration factors, the modification factors (control parameters) for each signal may be different and vary as a function of spatial position. The determination of the appropriate control parameters for each modifier 84, 86, 88, may be performed prior to assembly of the system 100 or after the assembly of the system 100.

The interpolation system 20 shown in FIG. 2 is one exemplary embodiment of one of the modifiers (84, 86, and 88) and the present invention. This embodiment is used for modifying digital signals that contain samples in row order from an orthogonal, raster type, sampling structure. In brief, the interpolation system 20 interpolates the digital signal across the spatial rows of the images represented by the digital signal; transposes the signal so that the digital samples representing the digital signal are in column order; interpolates the digital signal across the spatial columns of the image matrix; and transposes the images represented by the digital signal so that the digital samples are again in spatial row order.

A first interpolator 34 receives a digital signal from one of the digitizers 66, 68, or 70. In the system 100 where the CCD arrays 60, 62, and 64 produce signals in raster scan order, this received signal is a series of digital samples in spatial row order. The interpolator 34 interpolates new digital samples at desired spatial locations along each row from the surrounding received digital samples along the row. The desired spatial locations are determined as a function of desired magnification and registration factors of the output image and the current magnification and registration factors of the input image. In the exemplary embodiment, the interpolator 34 uses 12 input digital samples along the row of the received signal to generate each new output digital sample.

The first ping-pong transpose memory 36 receives the row-interpolated digital samples from the first interpolator 34. The memory 36 stores digital samples which define one entire image in one memory area while digital samples that define a previously stored image are sent, in spatial column order, to the second interpolator 44. The ping-pong transpose memory 36 transposes the row-interpolated digital samples generated by the first interpolator 34 so that the second interpolator 44 receives the digital samples which define an image in spatial column (or vertical) order.

The second interpolator 44 receives the row-interpolated digital samples in spatial column order and interpolates new digital samples at desired spatial locations in the columns of the image matrix.

The second ping-pong transpose memory 46 functions in a manner similar to the first ping-pong transpose memory 36 except that the second memory 46 changes the order of the column and row interpolated, digital samples from column order to spatial row order. This memory 46 generates output samples which are interpolated both horizontally and vertically and which are in raster-scan order.

The modified digital signal generated by the second ping-pong transpose memory 46 defines images similar to the images represented by the signal 74 which were provided to the interpolation system 20. The image signals generated by the memory 46, however, have magnification and registration factors modified to be substantially equal to the desired magnification and registration factors.

A controller 50 determines the coefficients that are used as the weights for the taps of each of the two interpolators 34 and 44, and also controls the operation of the ping-pong transpose memories 36 and 46. The controller determines which coefficients to use as weights for the taps of the filters based on the control values it receives from the source of control parameters 80.

A source of control parameters 80 provides the values used by controller 50 to determine the appropriate coefficients for the tap weights in the two interpolators 34 and 44 and to control the sequencing of the memories 36 and 46.

Figure 4:
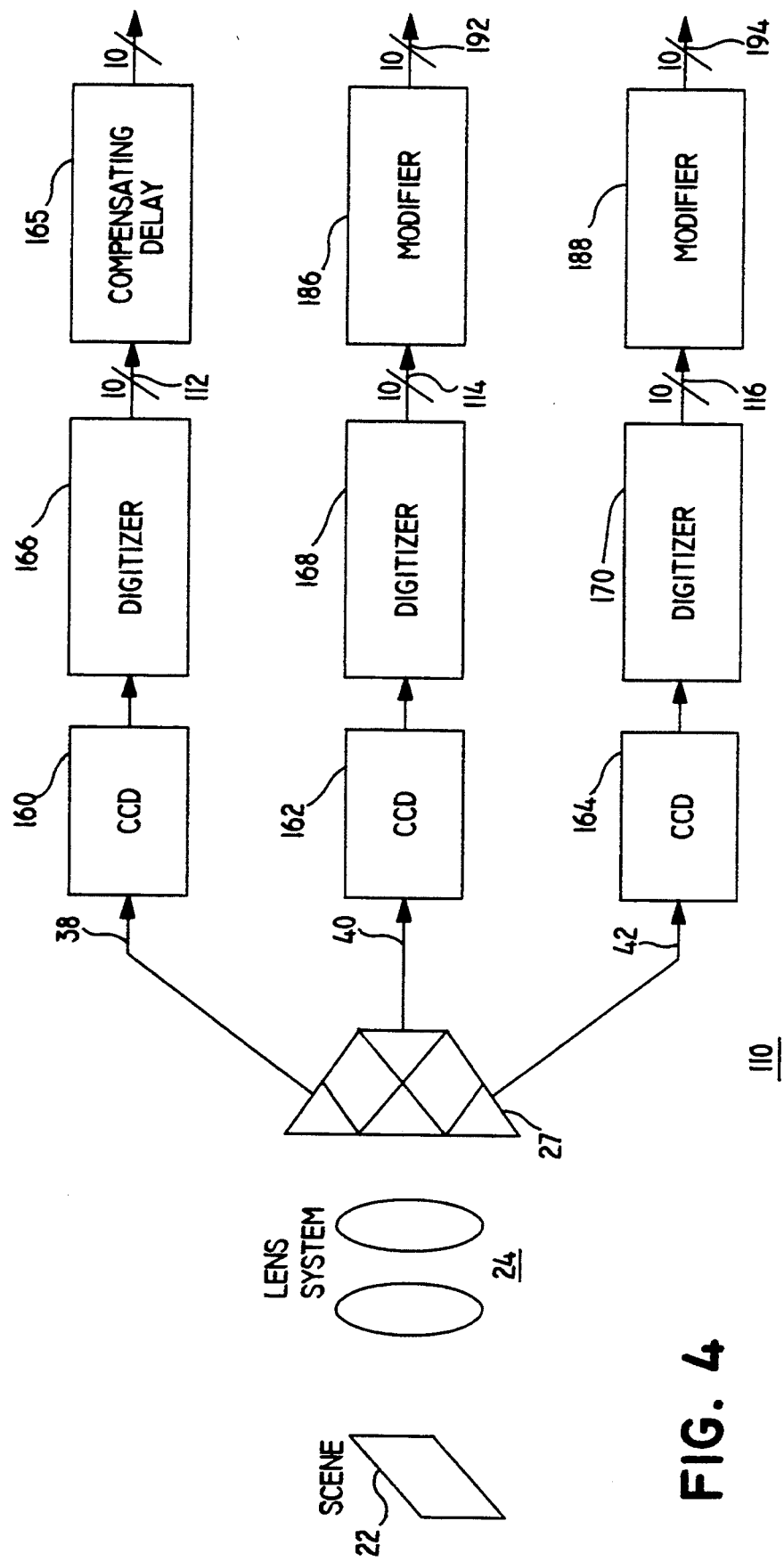
FIG. 4 is a block diagram which illustrates a second configuration of an exemplary camera system which includes another embodiment of the invention.

FIG. 4 shows a second camera system 110 which includes a second embodiment of the present invention. The camera system 110 shown in FIG. 4 is different in several ways from the camera system 100, shown in FIG. 1.

In the camera system 110, the prism 27 has color filters embedded in the prism so that the color filters 28, 30, and 33 (shown in FIG. 1) are not necessary in the system 110. The prism 27 produces signals similar to the signals produced by the combination of prism 26 and color filters 28, 30, and 33 in system 100 shown in FIG. 1.

In addition, in the camera system 110 only two of the three images, 40 and 42 have their magnification and registration factors modified. In this embodiment, the magnification and registration factors of the images 40 and 42 are modified to be substantially equal to those of the image 38. By selecting the magnification and registration factors of image 38 as the desired values and modifying images 40 and 42 accordingly, the three images 38, 40 and 42 can be combined to generate a single image with little or no distortion present due to chromatic aberrations, or misalignment of the CCD arrays 160, 162 or 164.

In this camera system 110, at least CCD arrays 162 and 164 produce data samples in a transposed raster scan order, i.e., in column order from top to bottom, left to right, in the image matrix. The CCD array 160, as shown, produces data samples in normal raster scan order. However, CCD array 160 may be replaced by a CCD array (not shown) which produces transposed raster scan order data samples if another transpose memory (not shown) were provided after the digitizer 166 to transpose the order of the data samples back to normal raster scan order. In addition, if all the CCD arrays 160, 162, and 164 produced data samples in raster scan order, then the modifiers shown in FIG. 2 would be used in the system 110.

The advantage of the first difference between the camera 110 and the camera 110, that is, using the magnification and registration factors of the image 38 as the desired values, is that only two of the three images 40 and 42 are modified. The advantage of the second principal difference, that CCD arrays 162 and 164 produce data samples in transpose raster scan order, will become apparent as the second embodiment of the modifier (invention) is described below.

The digitizers 166, 168, and 170 operate in the same manner as digitizers 66, 68, and 70. The digitizers receive data samples from the CCD arrays 160, 162, and 164, respectively, and generate a digitized sample, for each data sample received.

The modifiers 186 and 188 receive the digital samples from the digitizers 168 and 170, respectively, and modify the magnification and registration factors of the images 40 and 42 represented by the digital samples so that they are substantially equal to the magnification and registration factors of the image 38 as it is spatially sampled by the CCD matrix 160. A compensating delay 165 delays the sample values provided by the digitizer 166 by an amount of time sufficient to compensate for signal processing delays through the modifiers 186 and 188.

An exemplary embodiment 120 of the modifiers 186 and 188 is shown in FIG. 5. This embodiment 120 is similar to the embodiment 20 shown in FIG. 2 except that there is no second ping-pong transpose memory. In addition, in this embodiment 120 the digital signal to be modified is a series of digital samples in transpose raster scan order (i.e. spatial column order). Thus the first interpolator 134 operates along the columns of the image matrix as did interpolator 44 in FIG. 2. The first ping-pong transpose memory 136 changes the order of the digital samples from spatial column order to row order as did ping-pong transpose memory 46 in FIG. 2. The second interpolator 44 operates along the spatial rows of the image matrix as did interpolator 34 shown in FIG. 2.

The controller 150 also operates in a manner similar to controller 50 except that controller 150 does not control a second ping-pong transpose memory and the order of operations is changed, i.e., the digital signal is first interpolated along the spatial columns, then transposed to spatial row order, and finally interpolated along the spatial rows of the image matrix to produce a corrected raster scan image signal.

The source of control parameters 180 also operates in a manner similar to the source of control parameters 80 shown in FIG. 2 except for the sequencing of the memory 136.

DETAILED DESCRIPTION OF THE EXEMPLARY EMBODIMENTS

The present invention is described in detail in terms of the first embodiment of the camera system 100 using modifier 20. Based on this description, one skilled in the art could readily implement a system similar to the second embodiment of the camera system 110 using modifier 120, the first embodiment of the camera system 100 using modifier 120, or the second embodiment of the camera system 110 using modifier 20 based on the discussion in the overview section and the detailed description of the first embodiment of the camera system 100 using modifier 20.

Referring to FIG. 1, in operation, the image input to the camera system 100 is the reflection of light rays from the scene 22. The lens system 24 receives the light reflected from the scene 24 and focuses the light through the prism 26 and filters 28, 30, and 33 onto the CCDs 60, 62, and 64.

The lens system 24 consists of one or more lenses and aperture devices which serve to select a portion of the light rays reflected from the scene 24. The lens system 24 controls the intensity of light reflected from the scene 24 by controlling the aperture of the lenses. In the exemplary embodiment of the invention, the lens system 24 may be a zoom lens. In this instance, the percentage of zoom is transmitted to the source of control parameters 80, shown in FIG. 2, by a lens controller (not shown).

The prism 26 is a conventional device which splits the light provided by the lens system 24 into components. In the system 110 shown in FIG. 4, the prism 27 also includes color filters which operate similar to the color filters 28, 30 and 33.

As described in the overview section, the color filters 28, 30, and 33 pass only certain frequencies of the light transmitted by the prism 26. In the exemplary embodiment, color filter 28 passes frequencies of light which define the color green. Thus the light passed by color filter 28 would be representative of the green monochrome signal 38 in the image produced by the prism 26. In the exemplary embodiment, color filter 30 generates a red monochrome signal 40 and color filter 33 generates a blue monochrome signal 42 from the images transmitted by the prism 26.

Each CCD array 60, 62, and 64 samples the signals 38, 40, and 42, respectively, at a prescribed frame rate which is commonly controlled by a scan controller (not shown). The CCD arrays generate charge-packet samples substantially equal to the intensity of the signal at respective defined spatial locations.

The sampling of the signals is based on an orthogonal structure along X and Y axes with the origin in the upper left hand corner of the image. The signals are sampled at spatial increments of $T_x$, and $T_y$ along the spatial rows and columns of the image. In the exemplary system, each image is sampled at a 60 Hz frame rate and consists of 768 rows and 480 columns. In sum in this embodiment with modifier 20 (shown in FIG. 2), the CCD arrays, under the control of a scan controller, output charge-packet samples in spatial row order from the upper left hand corner along the first row from left to right, from the top to the bottom of an image. This output order is the same as the output ordering of a raster scanning device which has orthogonal sampling structure.

The digitizers 66, 68, and 70 receive the charge-packets from the CCD arrays 60, 62, and 64, respectively, and digitize the charge in each packet into a 10-bit digital value. There are many different forms of digitization that could be used as a function of the dynamic range of the intensity of light and the distribution function of the intensity of the light represented by the charges in the packets. One skilled in the art area of the present invention could readily determine the optimal digitization method for each implementation of the camera system 100.

The modifiers 84, 86, and 88, shown in detail in FIG. 2, receive the digital samples from the digitizers 66, 68, and 70, respectively. Each modifier 84, 86, and 88, performs the functions necessary to change the magnification and registration factors of the input image to some desired magnification and registration factors.

Thus, the modifiers are used to modify the magnification and registration factors of the images represented by the digital signals 102, 104, and 106. In detail, the camera system 100 distorts the image processed by it and thus acts a transfer function g(x,y) described by equation (1).

$$g(x,y) = f(R_x + C_x(x,y)*x, R_y + C_y(x,y)*y) \qquad (1)$$

where f(x,y) is a function representing the image before it passed through an ideal camera system, $R_x$ and $R_y$ are the registration errors, $C_y(x,y)$ and $C_x(x,y)$ are the magnification correction factors, and the origin of the coordinate system is at the center of the lens system 24. If the lens system 24 is circular and does not produce geometric distortions, then $C_x$ may equal $C_y$ and the magnification correction factors may not vary as a function of spatial position, i.e., x or y.

As shown in equation 1, the camera system causes the image, f(x,y) to be spread or condensed spatially (magnified positively or negatively) as a function of distance from the center of the lens system 24 and in addition as a function of the spatial location of any defects in the lens system which cause geometric distortions. If the function g(x,y) is sampled at the intervals $T_x$ and $T_y$, the function becomes $g(mT_x, nT_y)$ which is equal to a spatially sampled function of g(x,y) denoted as h(m,n).

However due to the distortion function, described above, the sample values of g(x,y) taken at the spatial intervals $T_x$ and $T_y$ (by the CCD arrays) are not equal to values of image at the spatial intervals in the original image input to the camera system 100, f (x,y). It can be shown that the sampled version of the undistorted image, f(x,y), denoted as f(m,n) is equal to a translated version of h(m,n) as shown in equation (2).

$$f(m,n) = h((m - R_x)/C_x(m,n), (n - R_y)/C_y(m,n)) \qquad (2).$$

Therefore, one way of correcting the distortion caused by the camera system 100 consists of using the sampled image h(m,n) to generate the sample image f(m,n) as shown in equation (2). This, however, requires generating values for samples of h(m,n) at non-integer values of m or n, while there are only samples available at the integer values of m and n.

One method to determine a sample at a non-integer value of m or n from samples available at integer values of m and n is to interpolate the new samples from the available samples. The modifiers 84, 86, and 88, shown as 20 in FIG. 2, use this method.

As shown in FIG. 2 and described above in the overview of the invention, the modifier 20 interpolates new samples first across the rows of the image matrix and then across the columns of the image matrix. In the second embodiment of the invention 120, shown in FIG. 4, the modifier 120 interpolates new samples first across the columns of the image matrix and then across the rows of the image matrix. Alternatively, the system shown in FIG. 2 could interpolate the samples first across the columns and then across the rows while the system shown in FIG. 4 could interpolate first across the rows and then across the columns. Both techniques are possible since equation (2) is a separable function.

With this background, the detailed operation of the modifier 20 is presented. As shown in FIG. 2, the modifier 20 includes two interpolators 34 and 44, two ping-pong transpose memories 36 and 46, a controller 50, and a source of control parameters 80. A digital signal to be modified 74 is received from some source. In the exemplary embodiment, the source is one of the digitizers 66, 68, and 70.

Figure 3:
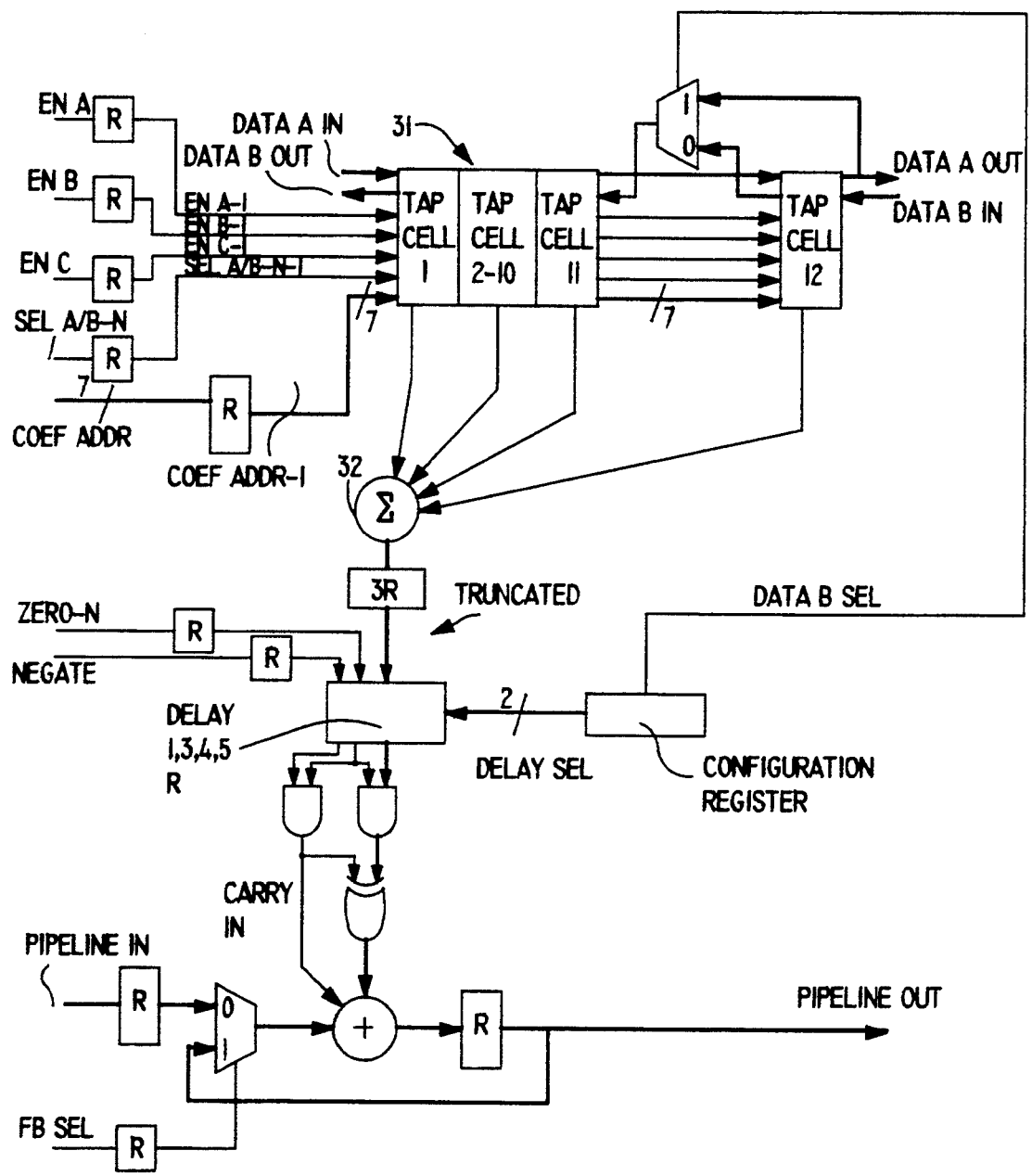
FIG. 3 is a block diagram which illustrates an interpolator suitable for use in the modifier shown in FIGS. 2 and 5.

In the exemplary embodiment, the interpolator 34 receives the 10-bit digital samples 74 from a digitizer (66, 68 or 70) and performs the interpolation described above along the spatial rows of the image matrix. FIG. 3 shows circuitry suitable for use as the interpolator 34 or 44 (or 134 or 144 in FIG. 5). This circuitry is described in detail in U.S. Pat. No. 5,057,911, entitled SYSTEM AND METHOD FOR CONVERSION OF DIGITAL VIDEO SIGNALS which is hereby incorporated by reference for its teaching on the structure and operation of the interpolator.

The interpolator 34 is a general purpose interpolator/modulator which may be programmed via a number of control signals to perform a variety of interpolation operations. In the exemplary embodiment, the interpolator 34, shown in FIG. 3, receives the digital samples from a digitizer on the line denoted DATA A IN and the selection of coefficients to use in the interpolation process from the controller 50, signal 52, on the line denoted COEF ADDR.

The interpolation processing for the spatial rows of the image matrix is performed in interpolator 34. Digital samples are obtained at the spatial locations indicated in equation 2 using the received digital samples. The interpolator 34 generates a digital sample at the spatial location indicated by equation (2) by determining the weighted sum of twelve received digital samples at spatial locations surrounding the indicated spatial location. Those skilled in the art of digital image processing will readily understand the process performed in interpolator 34 by referring to above referenced U.S. patent. Controller 50 generates the signals 52 and 56 which are used in interpolator 34 and in interpolator 44 to select which coefficients to use as weights in the interpolation process. As detailed in the U.S. patent, controller 50 can select, at the sample clock rate, from among 108 different sets of coefficients available for interpolator 34 or 44. Thus the interpolators 34 and 44 may generate samples at as many as 108 different inter-sample positions.

The basic principles of changing the size of a video image using horizontal and vertical interpolation are described in U.S. Pat. No. 4,774,581 entitled TELEVISION PICTURE ZOOM SYSTEM which is hereby incorporated by reference.

Referring to FIGS. 2 and 3, interpolator 34 interpolates input samples values by summing twelve weighted digital samples. The interpolation process stores received samples in a delay line which includes tap cells 31. It then multiplies twelve spatially nearby received digital samples by the coefficients selected by a signal 52 provided by the controller 50 as shown in FIG. 3. Then the interpolator 34 or 44 sums the weighted digital samples in a summer 32. The digital filtering process performed by the interpolator 34 or 44 uses conventional finite impulse response (FIR) filtering techniques.

The digital signal generated by the first interpolator 34 contains digital samples at the row locations indicated by equation (2).

The first ping-pong transpose memory 36 receives the spatial row order, row interpolated, digital samples generated by the first interpolator 34 over the bus 76. The ping-pong transpose memory 36 receives and stores digital samples representing one image while sending the digital samples representing the previous received and stored image in spatial column order to the second interpolator 44.

To perform this operation, a ping-pong transpose memory may consist of two addressable memory areas (not shown) which can receive and store digital samples representing an entire image and can send out digital samples by address. A ping-pong transpose memory may, for example, have an multiplexer (not shown) at its input port. The multiplexer may direct the incoming digital samples into one of the two addressable memory areas. A ping-pong transpose memory may also, for example, have a demultiplexer at its output port. The demultiplexer may select which addressable memory area to read to generate digital samples to send to the second interpolator 44.

To perform the transpose of each image, this ping-pong transpose memory receives control signals that indicate which digital samples to send to the second interpolator 44 and where to store received digital samples. The controller 50, provides these control signals.

The second interpolator 44 receives column order, row interpolated, digital samples from the first ping-pong transpose memory 36 over the bus 78. The second interpolator 44 operates in the same manner as the first interpolator 34 described above except that the second interpolator operates on each spatial column of the image matrix. The interpolator 44 receives the input signal DATA A IN from the ping-pong transpose memory 36 over the bus 78 responsive to the control signal 56 provided by the controller 50. Interpolator 44 determines the digital values at column locations indicated by equation (2). Interpolator 44 uses six received digital samples, located on either side of the indicated column location, in a 12-tap FIR filter to determine the digital value of the interpolated sample. The coefficients used to produce any given sample are selected by the control signal 56 provided by controller 50.

The second ping-pong transpose memory 46 receives the column order, column and row interpolated, digital samples from the second interpolator 44 over the bus 82. This ping-pong transpose memory 46 operates in a manner similar to the first ping-pong memory 36. It receives and stores digital samples representing one image, while it sends the transpose (row order) of digital samples representing a previously received and stored image. In this embodiment, the second ping-pong transpose memory 46 generates the output signal of the modifier 20.

The output signal of the modifier 20 is a modified version of the received digital signal 74. The modified digital signal is a row order, column and row interpolated, digital signal with the desired magnification and registration factors.

The controller 50 provides the control signals, 52, 56, 54, and 58 to the two interpolators, 34 and 44 and the two ping-pong transpose memories, 36 and 46, respectively. In the exemplary embodiment of the invention, the signals applied to the input ports of controller 50 are a 28 MHz clock signal and the control values from the source of control parameters 80. The 28 MHz clock signal used in this embodiment of the invention is actually a 28.63636 MHz signal (i.e. 8 times the frequency of the NTSC color subcarrier signal). The control values include the $R_x$, $R_y$, $C_x(x,y)$, and $C_y(x,y)$ parameters described in equation (2). These values are used to modify the magnification and registration factors of the digital signal 74 received by the modifier 20.

The controller 50 uses the control values to determine the spatial location of each new sample. Then, based on the relationship between this determined sample position and the positions of the received samples, the controller 50 determines which coefficients are to be used by each of the two interpolators, 34 and 44, to interpolate the new sample as determined by equation (2).

The controller 50 also counts the data samples being processed by the modifier 20 using the 28 MHz clock signal to determine when a new row is being processed in interpolator 34, a new column in interpolator 44 or a new image is being received in ping-pong memory 36 or 46. While not shown in FIG. 1, it is understood that the CCD arrays 60, 62, and 64 and the digitizers 66, 68, and 70 also receive the exemplary 28 MHz clock signal.

The source of the control parameters 80 provides the $R_x$, $R_y$, $C_x(x,y)$, and $C_y(x,y)$ values to the controller 50. The controller 50 provides the spatial position of the sample currently being interpolated in interpolator 34 or interpolator 44 to the source of control parameters 80.

There are a number of different ways in which the source of control parameters 80 could determine control parameters $R_x$, $R_y$, $C_x(x,y)$, and $C_y(x,y)$. For instance, the desired magnification and registration factors could be selected and provided to the source of control parameters 80 along with the current magnification and registration factors of the digital signal to be modified 74.

The magnification and registration correction factors can be set to the ideal set of $C_x(x,y)=C_y(x,y)=1$, and $R_x=R_y=0$, in which case the image would not be modified. Alternatively, these factors may be adjusted so that the desired magnification and registration factors (i.e. the combination of the magnification and registration correction factors and the actual magnification and registration factors of the image component) are equal to the magnification and registration factors of some other reference image such as the G (green) image of the three color signal set of R, G and B. This scheme is illustrated by the second embodiment of the invention shown in FIGS. 4.

If the desired magnification and registration factors are to be set equal to some reference signal, the desired factors are provided to the source of control parameters 80. Alternatively, the source of control parameters 80 may determine the magnification and registration factors of the an image that is processed by the camera system 100.

For example, to determine the desired magnification and registration factors of a reference image, a test image may be passed through the camera system 110 and reconstructed without interpolation. The difference or distortion in the reconstructed image may be measured to determine the magnitude of the distortion.

A black and white image could be used as the test signal. The digital signals 102, 104 and 106 would be stored in some memory device. Then the magnification and registration factors for each of the digital signals 102, 104, and 106 due to chromatic aberrations and CCD misalignment could be determined by noting the differences in the edges of the signals, especially at the edges of the black and white regions of the test image.

The source of control parameters 80 may also determine the factors from a copy of the test image stored in a memory device. This alternative embodiment may include signal processing means which determines the spatial misalignment between two or more images with reference to the stored test image.

To determine the magnification factors due to geometric distortions produced by the lens system 24, a test signal containing, for example, diagonal lines from both the left and right sides of the image could be used. The test image could be stored in a memory device. After first correcting the signals processed by the system for the distortions caused by chromatic aberrations and misregistration, the source of control parameters would determine the magnification distortion as a function of spatial position based on the corrected received signals the stored image and store these factors in table in a memory device. These factors combined with the chromatic aberration and misregistration factors would yield the parameters $C_x(x,y)$, $C_y(x,y)$, $R_x$ and $R_y$.

Alternatively, the magnification and registration factors of the digital signals 102, 104, and 106 may be determined externally and provided to the source of control parameters 80 since these factors do not change unless the lens system 24 or CCD arrays 60, 62, or 64 are moved or replaced.

Once the source of control parameters 80 has been programmed with the desired magnification and registration factors and the magnification and registration factors of the image input to system 20, it can determine the $C_x(x,y)$, $C_y(x,y)$, $R_x$, and $R_y$ parameters for each spatial sample of the images being processed in the modifier 20.

In a system which includes an optical zoom capability, the source of control parameters 80 is provided with the zoom factor since the magnification and registration factors change as a function of the zoom percentage. Therefore, this factor is taken into account when determining the $C_x(x,y)$, $C_y(x,y)$, $R_x$, and $R_y$ parameters needed to change the magnification and registration factors of the image input to the modifier 20.

As explained above by setting the desired magnification and registration factors equal to the values of the magnification and registration factors of one of the three color signals, only two color signals need to be corrected to match the magnification and registration factors of the chosen reference image. This is the technique used in the second exemplary embodiment of the camera system 110 as shown in FIG. 4. When, in this embodiment 110 all three color signals are combined there may still be geometric distortions, chromatic aberrations and misregistration, however, the chromatic aberration effect will not be visible since all the color signals will have the same effective chromatic aberration. This embodiment of the camera system 110 has the advantage that one less modifier is needed.

The modifier 120, which may be used in either camera system 100 or 110 depending on the output ordering of the CCDs, has the advantage that one less ping-pong memory is needed to perform the same operations as performed in modifier 20 shown in FIG. 2.

While the invention has been described in terms of two exemplary embodiments, it is contemplated that it may be practiced with modifications within the spirit and scope of the appended claims.

What is claimed:

1. A signal processing system for processing at least one component of a multi-component image, where each of the image components is represented by a signal having spatial rows and columns which define a magnification function, where the magnification function of the at least one image component does not match the magnification functions of the other components of the multi-component image due to light which generates the at least one image component having been processed by a camera system, the signal processing system comprising:

means for generating a plurality of sampled data signals representing, respectively, each component of the multi-component image;

row interpolating means for interpolating along the spatial rows of the at least one image component to generate a row corrected sampled data signal having a desired magnification function which is consistent across each row of the image; and column interpolating means, separate from said row interpolating means, for interpolating along the spatial columns of the image component represented by said row corrected sampled data signal to generate a row and column corrected sampled data signal having a magnification function which is consistent across the image and which is substantially equal to the desired magnification function along both the spatial rows and columns of the image component.

2. A signal processing system according to claim 1, further comprising:

means for determining the magnification function of the at least one image component.

3. A signal processing system according to claim 2, where each of the row interpolating means and the column interpolating means includes a twelve tap Finite Impulse Response (FIR) filter each tap of which is selectively programmable such that the filter implements one of a plurality of interpolation characteristics, each interpolation characteristic representing a respectively different change in magnification functions.

4. A signal processing system according to claim 1, where the multi-component image includes three image components, the magnification functions of two of the three image components are changed and the magnification function of the other one of the image components is unchanged, and the desired magnification function is equal to the magnification function of the other one of the image components.

5. A signal processing system for processing at least one component of a multi-component image, where samples of a sampled data signal representing the image are arranged in a matrix having spatial rows and columns, and the image, as represented by the matrix, has magnification function and registration factors, the signal processing system operating to change the magnification function and registration factors of the at least one component of the multi-component image to some desired magnification function and registration factors, the signal processing system comprising:

row interpolating means for interpolating among samples of the at least one image component which samples are taken along the spatial rows of the at least one image component to generate a row corrected sampled data signal having magnification function and registration factors which are substantially equal to the desired magnification function and registration factors along the spatial rows of the image component; and column interpolating means, separate from the row interpolating means, for interpolating among samples of the row-corrected sampled data signal, taken along the spatial columns of an image component represented by said row corrected sampled data signal, to generate a row and column corrected sampled data signal having a magnification function and registration factors which are substantially equal to the desired magnification function and registration factors along both the spatial rows and columns of the image component.

6. A signal processing system according to claim 5, where the signal processing system further comprises:

means for determining the magnification function and registration factors of the at least one image component.

7. A signal processing system according to claim 6, wherein:

the multi-component image includes three image components, the means for determining the magnification function and registration factors includes means for determining the magnification functions and registration factors of each of the three image components, the magnification functions and registration factors of two of the three image components are changed and the magnification function and registration factor of the other one image component is unchanged, and the desired magnification and registration factors are equal to the magnification function and registration factors of the other one image component.

8. A signal processing system for processing at least one component of a multi-component image, each component of the multi-component image being represented by a matrix of samples, said matrix having spatial rows and columns and each component of the image, as represented by the matrix, having a magnification function, the signal processing system operating to change the magnification function of the at least one component of the multi-component image to some desired magnification function, the signal processing system comprising:

column interpolating means for interpolating among samples of the at least one image component which samples are taken along the spatial columns of the at least one image component to generate a spatial column order, column corrected sampled data signal having a magnification function which is consistent along the columns of an image component represented by the column corrected sampled data signal, and which is substantially equal to the desired magnification function;

reordering means for reordering said spatial column order, column corrected sampled data signal to generate a spatial row order, column corrected sampled data signal; and row interpolating means, separate from the column interpolating means, for interpolating among samples of the spatial row order, column corrected sampled data signal to generate a spatial row order, row and column corrected sampled data signal having a magnification function which is substantially the same as the desired magnification function along both the spatial rows and columns of the image component represented by the spatial row order, row and column corrected sampled data signal.

9. Apparatus as in claim 8, where the reordering means includes;

a ping-pong memory device having first and second memory areas which alternately store a received data signal representing an image and means for alternately fetching the stored data from the second and first memory areas, respectively, such that the fetched data represents a transpose of the image represented by the stored data signal.

10. A signal processing system for processing at least one component of a multi-component image, each component of the multi-component image being represented by a matrix of samples, said matrix having spatial rows and columns and each component of the image, as represented by the matrix having a magnification function, the signal processing system operating to change the magnification function of the at lease one component of the multi-component image to some desired magnification function, the signal processing system comprising:

row interpolating means for interpolating among samples of the at least one image component which samples are taken along the spatial rows of the at least one image component to generate a spatial row order, row corrected sampled data signal having a magnification function which is consistent across the rows of an image component represented by the row corrected sampled data signal and which is substantially equal to the desired magnification function;

reordering means for reordering said spatial row order, row corrected sampled data signal to generate a spatial column order, row corrected sampled data signal; and column interpolating means, separate from the row interpolating means, for interpolating among samples of the spatial column order, row corrected sampled data signal to generate a spatial column order, row and column corrected sampled data signal having a magnification function which is substantially equal to the desired magnification function along both the spatial rows and columns of the image component represented by the spatial column, row and column corrected sampled data signal.

* * * * *